J. G. Hitchcock.
Hay-Fork.
N° 73009. Patented Jan. 7, 1868.
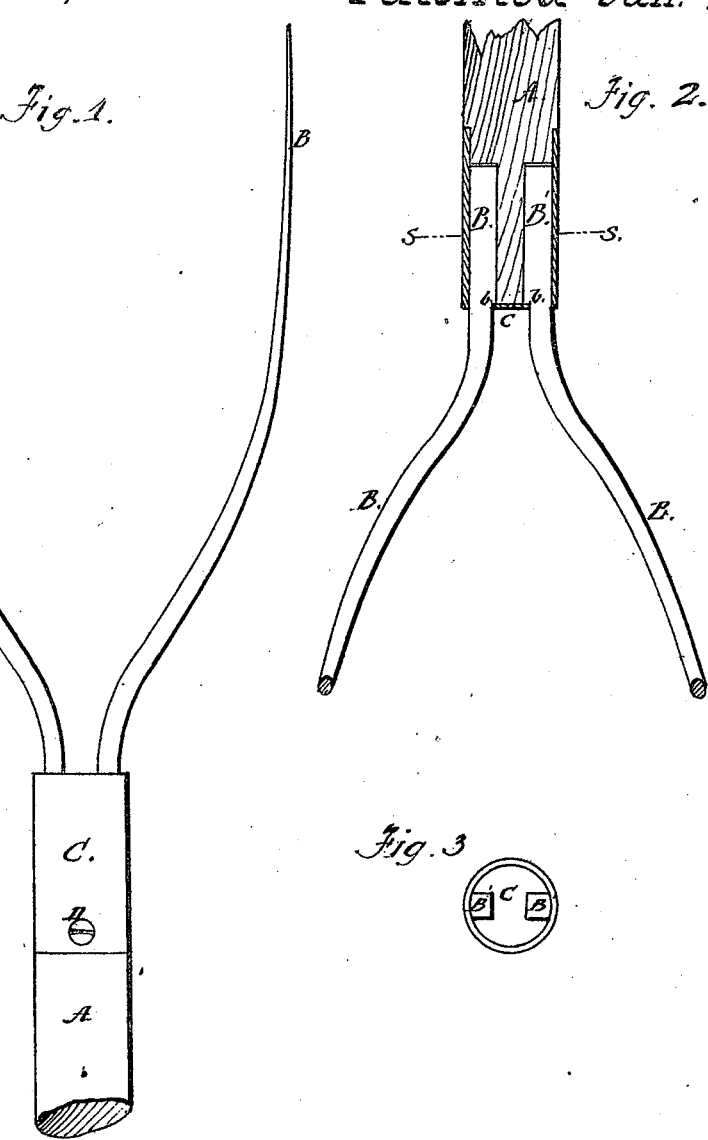

United States Patent Office.

JOHN G. HITCHCOCK, OF NEW YORK, N. Y.

Letters Patent No. 73,009, dated January 7, 1868.

---

IMPROVEMENT IN HAY-FORKS.

---

The Schedule referred to in these Letters Patent and making part of the same.

---

TO ALL WHOM IT MAY CONCERN:

Be it known that I, JOHN G. HITCHCOCK, of the city and county of New York, and State of New York, have invented certain new and useful Improvements in the Construction of Forks for Handling Hay and the like; and I do hereby declare that the following is a full and exact description thereof.

I will first describe what I consider the best means of carrying out my invention, and will afterwards designate the points which I believe to be new. The accompanying drawings form a part of this specification.

Figure 1 is a face view of the several parts properly joined, but with only a portion of the handle.

Figure 2 is a central section through the novel parts, and

Figure 3 is a cross-section on the line S S in fig. 2.

Similar letters of reference indicate like parts in all the figures.

A is the handle, which may be of any suitable wood. B B are the tines, and B' B' are the shanks, or the portions of the tines by which they are connected to the handle. The handle A is grooved, to allow the shanks B' B', of the tines, to be embedded therein, as represented. C is a cap, which is adapted to fit on the end of the handle A, and to enclose the shanks B' B', as represented. D is a screw, which is inserted through the cap C, and threaded into the material of the handle A. The tines B B are introduced through their respective holes in the cap C, previous to the insertion of the handle. Their shape allows them to move forward in their respective holes, until they reach the right point. A small projection, $b$, on each shank, locks against the interior of the cap C, at the end, and prevents the tine from being drawn out by an end pull. The tines are squared at the point where they rest in the cap C, and the holes in the cap are correspondingly squared, and are fitted closely.

I prefer to make hay-forks exactly as here described, but the invention allows of various modifications in the proportions and in the working out of the several details. I consider it indispensable that the locking-parts $b$ shall be fitted and arranged relatively to the cap C, as represented, either by producing them on the shanks, in the form of projections, as represented, or by deflecting the main body of the shank to one side, or otherwise, so that it shall produce a shoulder at each point indicated by $b$, adapted to lock firmly, and resist, with great force, any strain tending to pull the tine out of its connection with the handle.

In adapting my invention to dung-forks, and analogous forks, requiring more than two tines, I introduce the supplementary tines either in the middle of the handle, or above, or below, as may be preferred, locking each into the cap C by a projection or shoulder, as indicated by $b$, and securing the cap C firmly to the handle A. I believe that the adaptation of my invention to the making of forks with three or more tines, will be easily executed by any good mechanic from this description.

Having now fully described my invention, what I claim as new therein, and desire to secure by Letters Patent, is as follows:

1. I claim holding the tines against end pull by means of the projections or shoulders $b$, arranged to lock against the ferrule or cap C, while the latter is fixed on the handle by the screw D, or its equivalent, all substantially as herein set forth.

2. I claim the within-described construction of the fork-tines B, with a shoulder $b$, at the commencement of the root of the tine, adapted to apply against a solid end of the cap C, substantially as and for the purpose herein set forth.

JOHN G. HITCHCOCK.

Witnesses:
W. C. DEY,
C. C. LIVINGS.